US008751306B2

(12) United States Patent
Burger et al.

(10) Patent No.: US 8,751,306 B2
(45) Date of Patent: Jun. 10, 2014

(54) VIRTUAL IDENTITY MANAGER

(75) Inventors: Doug Burger, Bellevue, WA (US); Lili Cheng, Bellevue, WA (US); Xuedong Huang, Bellevue, WA (US); Stelios Paparizos, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 33 days.

(21) Appl. No.: 13/164,681

(22) Filed: Jun. 20, 2011

(65) Prior Publication Data

US 2012/0323686 A1 Dec. 20, 2012

(51) Int. Cl.
*G06Q 30/00* (2012.01)
(52) U.S. Cl.
USPC ...................................... 705/14.53
(58) Field of Classification Search
None
See application file for complete search history.

(56) References Cited

U.S. PATENT DOCUMENTS

| | | |
|---|---|---|
| 7,020,778 B1 | 3/2006 | Miettinen et al. |
| 2006/0149846 A1 | 7/2006 | Schuba |
| 2007/0105531 A1 | 5/2007 | Schroeder |
| 2008/0011825 A1 | 1/2008 | Giordano et al. |
| 2009/0133110 A1 | 5/2009 | Kumar et al. |
| 2009/0298480 A1 | 12/2009 | Khambete et al. |
| 2010/0216430 A1 | 8/2010 | Brown et al. |
| 2010/0229245 A1 | 9/2010 | Singhal et al. |
| 2010/0241663 A1 | 9/2010 | Huang et al. |
| 2010/0255812 A1 | 10/2010 | Nanjundaiah et al. |
| 2010/0255815 A1 | 10/2010 | Goldthwaite et al. |
| 2012/0191545 A1* | 7/2012 | Leibu et al. ................. 705/14.66 |

FOREIGN PATENT DOCUMENTS

KR 1020020041355 A 6/2002

OTHER PUBLICATIONS

Roussos, et al., "Mobile Identity Management: An Enacted View", Retrieved at <<http://citeseerx.ist.psu.edu/viewdoc/download?doi=10.1.1.58.9675&rep=rep1&type=pdf>>, International Journal of Electronic Commerce, vol. 8 No. 1, 2003, pp. 1-38.

Paci, et a., "VeryIDX—A Digital Identity Management System for Pervasive Computing Environments", Retrieved at <<http://disi.unitn.it/~paci/seus.pdf>>, Proceedings of the 6th IFIP WG 10.2 international workshop on Software Technologies for Embedded and Ubiquitous Systems, 2008, pp. 12.

Georges, Fanny, "Who are you doing? Declarative Acting, and Calculated Identity in Web 2.0", Retrieved at <<http://hal.archives-ouvertes.fr/docs/00/49/68/16/PDF/Digital_identity_FG_LAVAL2009.pdf>>, Virtual Reality International Conference, 2009, pp. 7.

(Continued)

*Primary Examiner* — Daniel Sorkowitz
(74) *Attorney, Agent, or Firm* — Jim Sfekas; Kate Drakos; Micky Minhas

(57) ABSTRACT

A computing system and method for managing an identity of a user are provided. A server may be configured to communicate with each of a plurality of client devices in corresponding request and response streams. An inference engine is configured to monitor the request and response streams for identifying factors that distinguish each of the plurality of client devices from other of the plurality of client devices. Upon detecting one or more of the identifying factors for each of the two or more client devices that match within a threshold probability, the inference engine makes an inference that two or more of the plurality of client devices are used by the user. Based upon the inference, the inference engine creates a virtual identity record at the server linking the two or more client devices.

19 Claims, 4 Drawing Sheets

(56) References Cited

OTHER PUBLICATIONS

Maliki, et al., "User-centric Mobile Identity Management Services1", Retrieved at http://asg.unige.ch/publications/TR08/ASG2008-3.pdf>>, Retrieved Date: Apr. 4, 2011, pp. 33-76.

Roussos, et al., "Mobile Identity Management", Retrieved at http://citeseerx.ist.psu.edu/viewdoc/download? doi=10.1.1.101.3417&rep1=rep1&type=pdf>>, Retrieved Date: Apr. 4, 2011, pp. 9.

"International Search Report", Mailed Date: Feb. 1, 2013, Application No. PCT/US2012/043039, Filed Date: Jun. 18, 2012, pp. 8. (MS# 332807.02).

* cited by examiner

US 8,751,306 B2

VIRTUAL IDENTITY MANAGER

BACKGROUND

With the proliferation of mobile computing devices, including smart phones, tablets, laptop computers, and the like, a single user may have multiple devices through which the user accesses various online services, networks and platforms. These different services, networks and platforms may have different access requirements and identification mechanisms that require the user to maintain multiple, disparate identification sources (user id/password combinations, PINs, etc). A user may therefore have an online experience that is fragmented, and that does not allow the user's identification information to be easily and securely shared with the multiple services, networks and platforms utilized by the user.

In another example, when a user begins using a new device to access an online service that the user has previously accessed with a prior device, the user may be prompted to execute verification procedures to confirm the user's identity since the service does not recognize the new device, interrupting the user with an additional time consuming task. Additionally, the lack of visibility of a user's various identification information may result in the user receiving advertising and recommendations that lack relevance to the user.

SUMMARY

A system and method for managing an identity of a user is disclosed herein. In one example the system includes a server configured to communicate with a plurality of client devices in corresponding request and response streams. An inference engine is configured to monitor the request and response streams between the server and each of the plurality of client devices for identifying factors that distinguish each of the plurality of client devices from other of the plurality of client devices. Upon detecting that one or more identifying factors for each of two or more client devices match within a threshold probability, the inference engine is configured to make an inference that the two or more client devices are used by the user. Based upon the inference, the inference engine creates a virtual identity record at the server linking the two or more client devices. The system may also include an identity verification engine configured to receive an identity verification request inquiring about an unverified user logging into a service from a different client device than is on record with the service. The request may ask whether the different client device is linked to the user in the virtual identity record.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
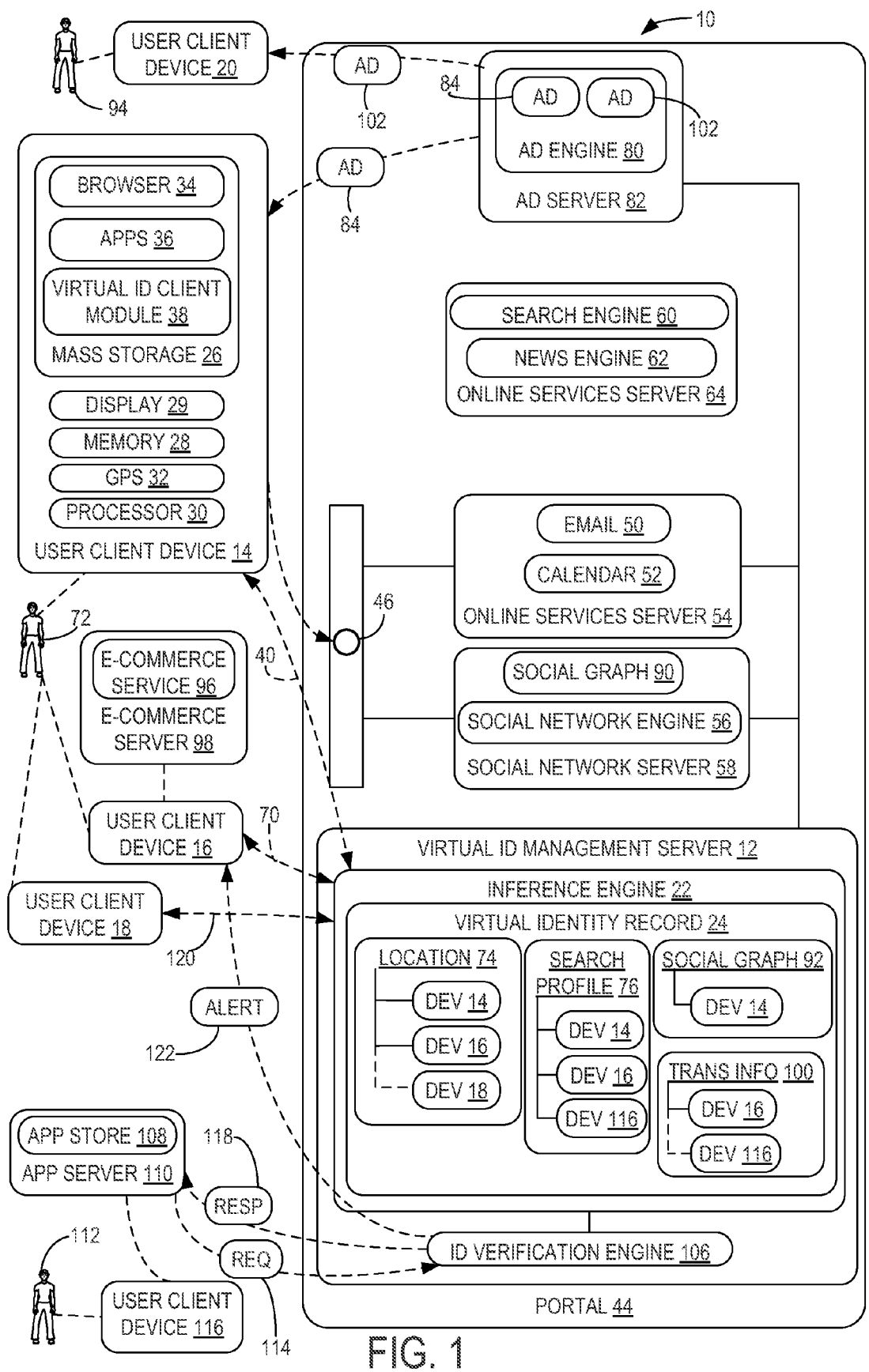
FIG. 1 is a schematic view of one embodiment of a system for managing an identity of a user, including an inference engine and an identity verification engine.

FIG. 1 illustrates generally one embodiment of a computing system 10 for managing an identity of a user. The computing system 10 includes a virtual ID management server 12 configured to communicate via computer networks such as the Internet with a plurality of client devices, including user client devices. As described in more detail below, the virtual ID management server 12 includes an inference engine 22 that is configured to create a virtual identity record 24 at the virtual ID management server that links two or more user client devices to a common user.

In one example, the user client device 14 includes mass storage 26, memory 28, a display 29, a processor 30, and a location-sensing technology, such as a GPS receiver 32. The GPS receiver 32 determines the location of the user client device 14 based on satellite signals and may periodically send the determined location of the device to the virtual ID management server 12 via a virtual ID client module 38, upon receiving appropriate consent to this location tracking from the user.

Programs such as a browser 34 and application programs ("apps") 36 stored in mass storage 26 may be executed by the processor 30 using memory 28, with output displayed on display 29, to achieve the various functions described herein. A virtual ID client module 38 may be provided on the user client device 14, which is configured to communicate with inference engine 22 of the virtual ID management server 12 via corresponding request and response streams 40. In other examples user client device 14 may include other components not shown in FIG. 1, such as user input devices including touch screens, keyboards, mice, game controllers, cameras, and/or microphones, for example. Further, although not shown in FIG. 1, it will be appreciated that user client devices 16, 18, 20, and 114 have similar components that function in a similar manner as described above for user client device 14.

As one example, the virtual ID management server 12 may reside at a portal 44 that provides a single point of access to a variety of information and services. A user with a user account at the portal 44 may log in, for example, with a username and password through access control point 46 to access various information and services, such as email 50 and calendar 52 services hosted on an online services server 54, social networking services through a social network engine 56 hosted on a social network server 58, etc. It will be appreciated that the access control point may be implemented as a load balancing proxy server, in one embodiment. Other features and services may be accessed by users without logging into the portal 44, such as search via search engine 60, news via news engine 62, etc., hosted on another online services server 64.

Turning now to the process by which the inference engine 22 creates a virtual identity record 24 for a user, the inference engine monitors the request and response streams 40, 70, and 120 between the virtual ID management server 12 and user client devices 14, 16, and 18, respectively, for identifying factors that distinguish each of these devices from other user client devices. Examples of identifying factors that may be monitored include, but are not limited to, a device ID, a browser version, browser history, a browser cookie, a search profile, commercial transaction information, location information, and social graph information.

In one example user client device 14 may be a laptop computer having an IP address that resolves to a location near 100 Main Street, Anytown, USA. The virtual ID client module 38 on the user client device 14 sends the IP address to the inference engine 22 via stream 40 in response to a request from the inference engine 22. Given that IP address resolution to a geographic location has varying levels of accuracy, the inference engine 22 assigns a confidence factor of 80% to the 100 Main Street, Anytown, USA location, based on prior learnings. A browser cookie stored on the user client device 14 is used to track searches performed on the device to create a search profile, which is similarly monitored by the inference engine 22. In this example, searches performed include searches for Vietnam vacation rentals, XYZ automobiles, Anytown, USA plumbers and Mississippi river cruises.

User client device 16 may be a mobile communication device that receives a GPS signal placing the device at 100 Main Street, Anytown, USA. The virtual ID client module on the user client device 16 sends the location information to the inference engine 22 via stream 70 in response to a request from the inference engine 22. Given that geographic locations obtained via GPS signals are highly accurate, the inference engine 22 assigns a confidence factor of 99% to the 100 Main Street, Anytown, USA location of the user client device 16. A cookie stored on the user client device 16 is used to track the following searches performed on the device—searches for Vietnamese food, XYZ automobiles, Anytown, USA plumbers and Mississippi river cruises. A search profile containing these searches is also monitored by the inference engine 22.

When the inference engine 22 detects the above identifying factors and assigns the associated confidence factors, the inference engine determines whether the identifying factors for the user client devices 14 and 16 match within a threshold probability. If so, the inference engine makes an inference that user client devices 14 and 16 are used by the same user. The inference engine 22 then creates a virtual identity record 24 at the virtual ID management server 12 that links the user client devices 14 and 16 to a user, such as user 72.

The inference engine 22 is configured to estimate a degree of accuracy for an inference that user client devices 14 and 16 are used by the same user based in part on machine learnings from linking other users and their corresponding client devices. The inference engine 22 is also configured to monitor inferences that it has made, and adjust the degree of accuracy for the factors that led to the degree of accuracy determination based on whether the inference was later determined to be correct or incorrect. For example, in a portal environment such as that depicted in FIG. 1, devices about which a user inference has been made may later access services for which a user login is inputted. At this point, the portal may both update the virtual identity record with the new information regarding login of an identified user via the device, and also update the probabilities associated with the confidence factor(s) that led to the original inference, based on whether the original inference was correct or incorrect. In this manner, the inference engine may continually fine tune its estimated probabilities of device usage by certain users.

Continuing with the above example, given the same address and the confidence factors associated with the locations of user client devices 14 and 16, the locations may be determined to match within an 80% probability. In light of the search profile similarities, the search profiles of user client devices 14 and 16 may be determined to match within an 85% probability. Given these two probabilities, and based on machine learnings from linking other users and their corresponding client devices, the inference engine 22 estimates that a degree of accuracy for an inference that user client devices 14 and 16 are used by the same user is 75%. To make an inference that user client devices 14 and 16 are used by the same user, the inference engine 22 may set a threshold probability, such as 70%. Thus, in this example, because the estimated degree of accuracy exceeds the threshold probability, the inference engine 22 makes an inference that user client devices 14 and 16 are used by the same user 72. Upon making the inference, the inference engine 22 may send a request to the user 72 to verify the inference that user client devices 14 and 16 are both used by the user. The inference engine 22 may send the verification request to the user client device 14 or 16 that is linked to the user 72 with the higher degree of confidence.

Upon making the inference, the inference engine 22 creates the virtual identity record 24 for user 72 linking the user client devices 14 and 16 to the user. The virtual identity record 24 includes location data 74 that is populated with the user client devices linked to user 72 via location. A confidence factor associated with the location of each device is generally indicated by either a solid or dashed line. In the present example, user client devices 14 and 16 are included in the location data 74. The confidence factor associated with the location of user client devices 14 and 16 is 85% and 99%, respectively. As these confidence factors are above a predetermined threshold probability, such as 75%, user client devices 14 and 16 are shown as linked with a solid line. Another user client device 18 may also be included in the location data 74, but has a confidence factor of only 70%. Thus, user client device 18 is shown as linked with a dashed line.

In a similar manner, the virtual identity record 24 includes search profile data 76 that is populated with user client devices 14 and 16 linked to user 72 via their search profiles. In the present example, a confidence factor is not associated with the search profile from each device, and user client devices 14 and 16 are shown linked with a solid line. In other examples a confidence factor may be assigned to the search profile for each device and shown in the manner described above. An additional user client device 116 is also included in the search profile data 76.

The inference engine 22 may be configured to send information from the location data 74 and search profile data 76 to an ad engine 80 hosted on an ad server 82. The ad engine 80 and ad server 82 may be located on the portal 44 or remotely on a different network or platform. The ad engine 80 is configured to utilize the information received from the inference engine 22 to send a user-targeted ad 84 to user client device 14. The ad engine 80 may also send the ad 84 to user client device 16 and any other devices linked to user 72.

The inference engine may also be configured to determine that the user 72 has a relationship with another user based on social network information. The ad engine 80 may then be configured to serve a friend-targeted ad to a client device associated with the other user. With reference again to user client device 14, in one example request and response stream 40 may include social network information associated with interactions of the user 72 across a social network that establishes a social graph. User 72 may log into the portal 44 using user client device 14 to access the social network engine 56 and the social graph 90 associated with the user. Information from the social graph 90 of the user 72 that is accessed by user client device 14 may be stored in social graph data 92 in the virtual identity record 24. In this example, the inference engine 22 determines from the social graph 90 that the user 72 has a "friend" relationship with a user 94 who uses user client device 20.

As another example, the inference engine 22 of the virtual identity management server 12 may be configured to receive social graph information related to a user from a plurality of social networks executed on different social network servers.

Figure 4:
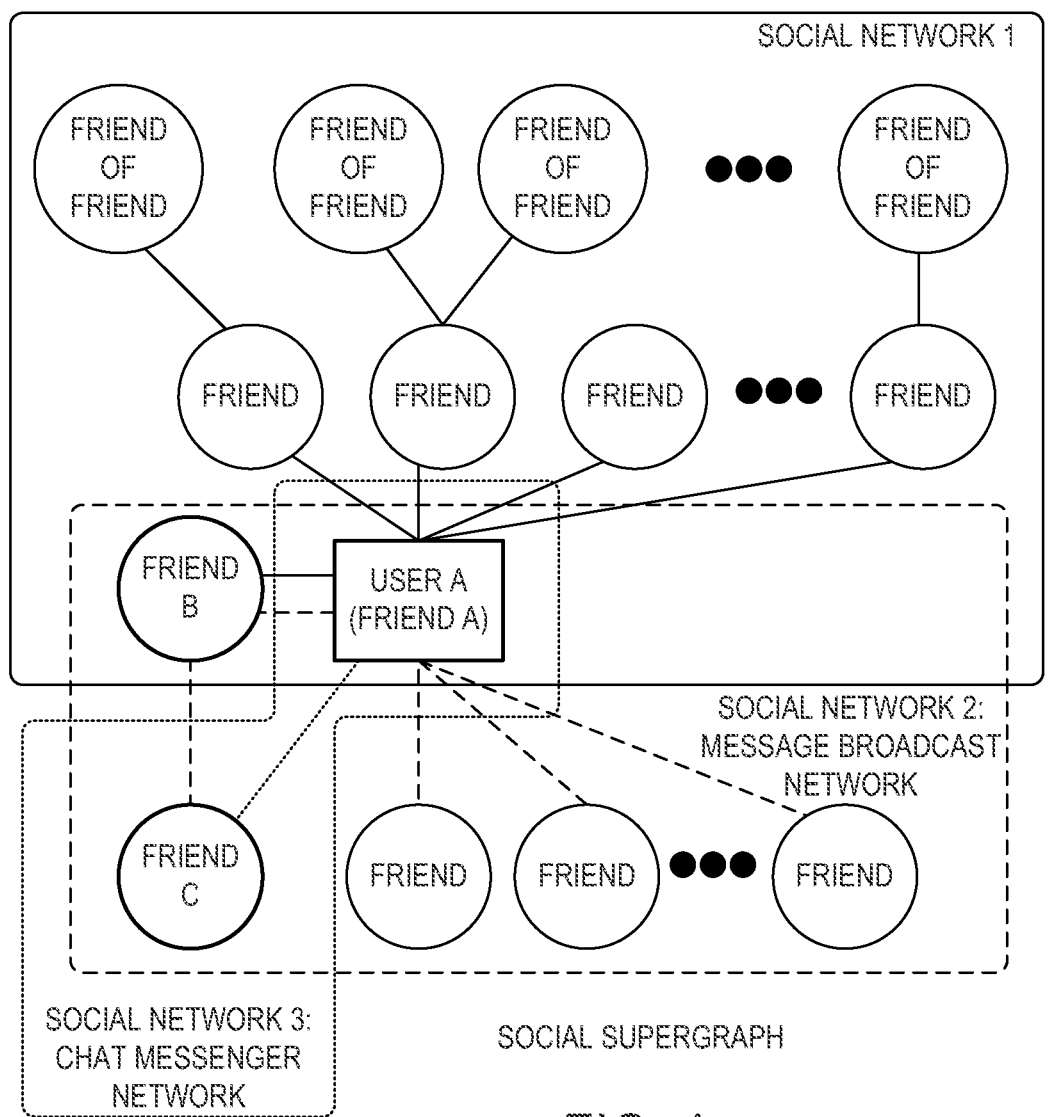
FIG. 4 is a schematic view of a social supergraph created by the system of FIG. 1.

As shown in FIG. 4, social graphs from three different social networks are illustrated: a social network 1, such as FACEBOOK®, used for two way communications with friends, a social network 2, such as TWITTER®, used to broadcast messages to a network of subscriber friends, and a social network 3, such as MICROSOFT® LIVE MESSENGER, used to exchange chat messages between friends.

As an example, a user A may have three unrelated accounts using unrelated usernames on each of social networks 1, 2, and 3. The inference engine of virtual identity management server 12 is configured to disambiguate between the user accounts based on similarities in the social graphs, and determine that the three social graphs illustrated in FIG. 4 belong to the same user, user A. Further, the inference engine is configured to create a social supergraph for the user from the plurality of social graphs from the different social networks. The social supergraph collapses the edges of each of the three graphs at User A in the illustrated example, and thereby connects each of the social graphs 1, 2, 3 together through the virtual identity of user A.

Further, the inference engine of the virtual identity management server may do the same for other friends in the user's social supergraph. It will be appreciated that the inference engine of the virtual identity manager may be configured to a compute cross social network communication path between users who are not otherwise connected to each other through each of the different social networks. In the illustrated example, user A is friends with friend B in social network 1, and in social network 2. User A is friends with friend C in social network 3. Further, friend B is friends with friend C in social network 3. By creating the social supergraph, the inference engine is able to compute that friends A, B, and C are mutual friends (i.e., friends with each other). This mutual friendship relationship may be valuable for providing the friends A, B, C with group oriented offers. Without the social supergraph, this information may have remained islanded in each of the different social graphs 1, 2, and 3.

User 72 may also make purchases through an e-commerce service 96 located on an e-commerce server 98 via user client device 16. Commercial transaction information associated with the purchases may be monitored by the inference engine 22 via request and response stream 70. The commercial transaction information may be stored in transaction data 100 in the virtual identity record 24. It will be appreciated that the commercial transaction information may indicate, among other things, that the user has purchased a product or service related to a shared interest between the user and a friend, which shared interest has been identified in the social network information described above. Upon making such a determination, the ad engine is configured to serve a friend-targeted ad to a client device associated with the friend based on the commercial transaction information.

In one example, user 72 purchases a Super Fast racing bicycle from the Bicycle Store e-commerce service 96 via e-commerce server 98. Through the social graph 90 of the user 72, the inference engine 22 has determined that user 94 is a friend of user 72, and that they exchange messages and links related to bicycle racing. Using the commercial transaction information indicating the user has purchased a Super Fast racing bicycle, which is related to the shared interest of bicycling, and based upon the social graph information regarding the shared interest in bicycling between the user and the friend of the user (user 94), the ad engine 80 may be configured to serve a friend-targeted ad 102 for Super Fast racing bicycles, to user device 20 that is associated with user 94.

Virtual ID management server 12 also includes an ID verification engine 106 that is configured to receive an identity verification request 114 from an online service, such as a third party application store 108 hosted on an application server 110. In one example, the request 114 may inquire about an unverified user 112 who is logging into the third party application server 110 from a user client device 116 that is different from those user client devices that are on record with the third party application store 108 and associated with the login credentials used by the unverified user. The request 114 asks whether the user client device 116 is linked to user 72 via the virtual identity record 24, where user 72 is associated with the login credentials used by the unverified user 112.

The request 114 may include a specified level of certainty that the user client device 116 is linked to the user 72 in the virtual identity record 24. In one example, the specified level of certainty may be delineated on a scale of 1-5, with 1 being the least certainty and 5 being the most certainty. For services generally associated with higher levels of security, such as online banking, a higher level of certainty may be requested. For services generally associated with lower levels of security, such as photo organizing and sharing services, a lower level of certainty may be requested. In the present example, the third party application store 108 may require a level 3 certainty that the user client device 116 is linked to the user 72.

In the virtual identity record 24, user client device 116 is included in the search profile file 76 and the transaction information file 100. Using this information, the ID verification engine 106 determines that a certainty that the user client device 116 is linked to the user 72, and that the unverified user 112 is therefore user 72, satisfies a level 3 certainty. The ID verification engine 106 then sends a response 118 to the third party application store 108 indicating that the user client device 116 is linked to user 72.

In another example, the ID verification engine 106 detects that an identifying factor detected in a stream 120 from user client device 18 via inference engine 22 is inconsistent with the virtual identity record 24 for user 72. User client device 18 may be a mobile communication device with a GPS receiver that indicates via stream 120 that it is currently located in New York City. Stream 120 may also indicate that user client device 18 has been used to make multiple e-commerce purchases from the New York City area. User client device 16, also a mobile communication device, indicates via its GPS receiver that it is currently located at 100 Main Street, Anytown, USA, the home address of user 72. From location data 74 of the virtual identity record 24, the ID verification engine 106 also determines that user client device 18 has been used by user 72 only three times for brief phone calls in and around Anytown, USA in the last two years. Based on this information, the ID verification engine 106 determines that the user client device 18 may have been lost or stolen, and that an unauthorized user currently may be using the device. The ID verification engine 106 may then send a potential fraud alert 122 to user client device 16, notifying user 72 about the possible unauthorized use of user client device 18.

Figure 2:
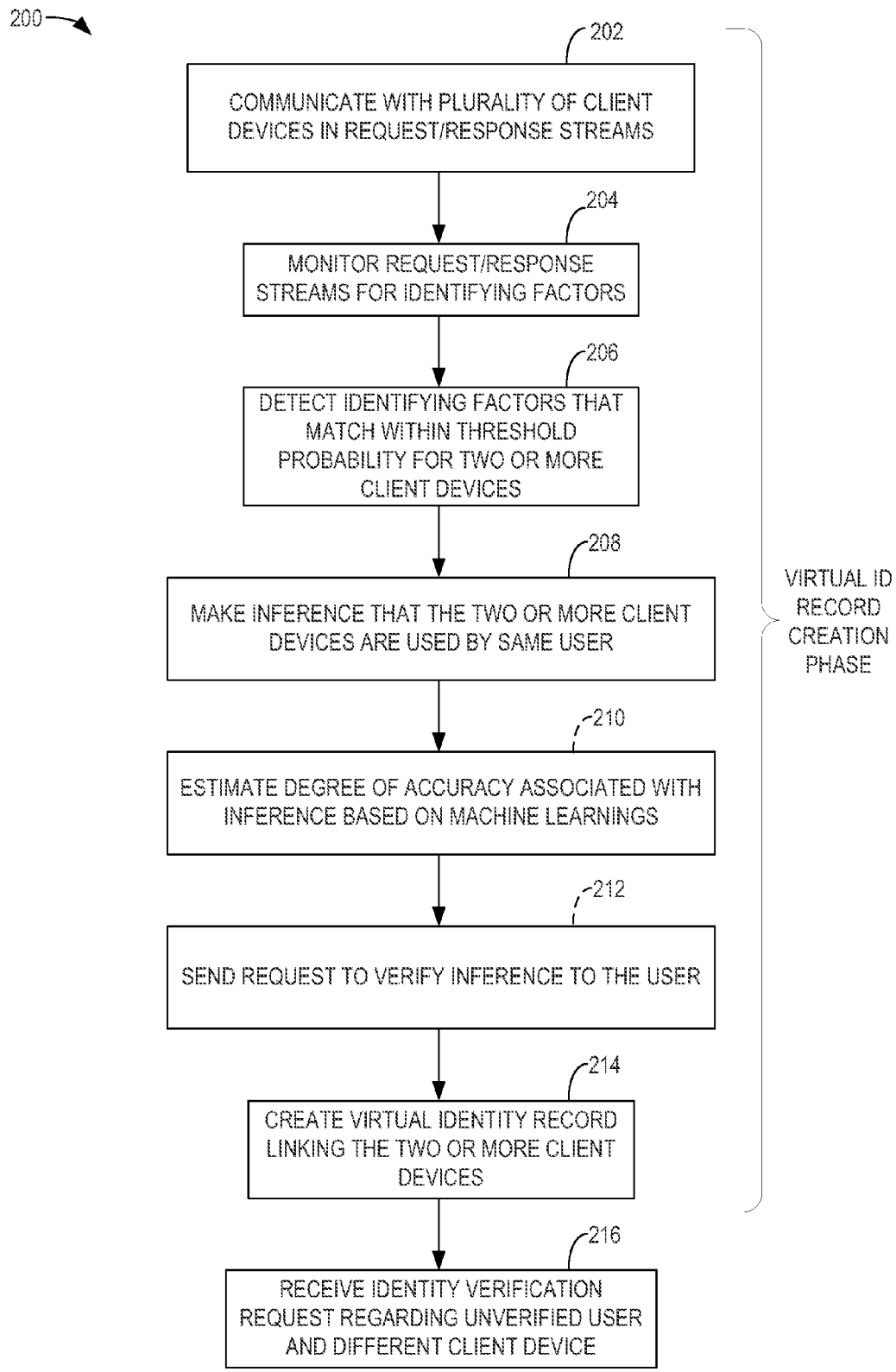
FIG. 2 is a diagram illustrating one embodiment of a method for managing an identity of a user.

With reference now to FIG. 2, a diagram illustrates a method 200 for managing an identity of a user according to one embodiment of the present disclosure. The method may be performed using the software and hardware components of the system 10 described above and shown in FIG. 1, or using other suitable components.

Initially, steps 202-214 of method 200 will be described, which comprise a virtual identity record creation phase of the method. At 202 the method includes communicating with each of a plurality of client devices, such as user client devices 14, 16 and 18, in corresponding request and response streams. At 204 the method includes monitoring the request and response streams for identifying factors that distinguish each of the plurality of client devices from other of the client devices. As noted above, the identifying factors may include, but are not limited to, a device ID, a browser version, browser history, a browser cookie, a search profile, commercial transaction information, location information, and social graph information.

At 206 the method includes detecting one or more of the identifying factors that match within a threshold probability for each of two or more of the plurality of client devices. As described above with reference to FIG. 1, the inference engine 22 may assign a confidence factor to each of the one or more identifying factors to determine whether the identifying factors match within a threshold probability. If so, at 208 the method includes making an inference that the two or more client devices are used by the same user. At 210 the method may include estimating a degree of accuracy associated with the inference based on machine learnings from linking other users and their corresponding client devices. Once the degree of accuracy has been estimated, at 212 the method may include sending a request to verify the inference to the user. Based upon the inference, at 214 the method then creates a virtual identity record that links the two or more client devices.

Figure 3:
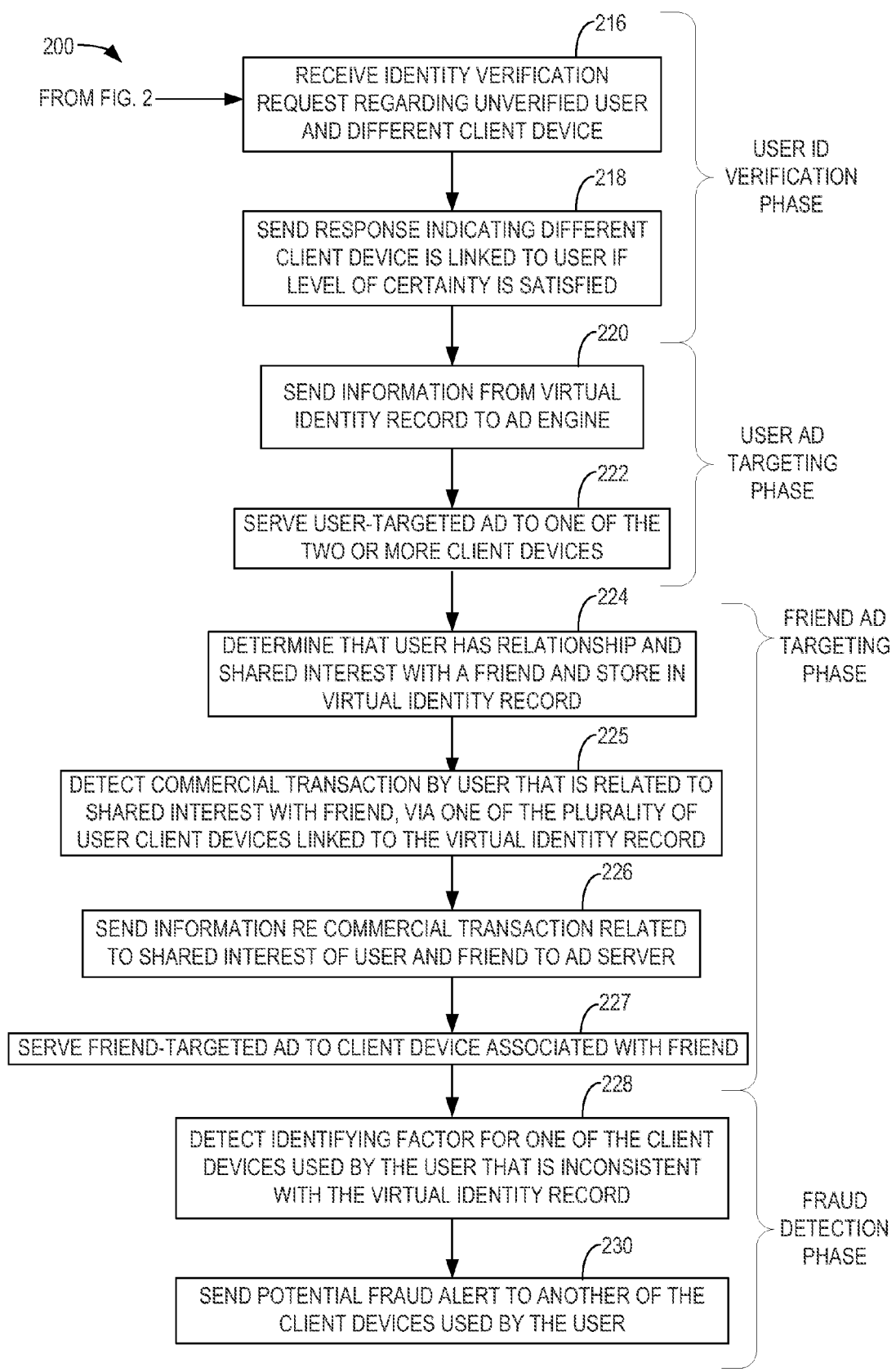
FIG. 3 is a continuation of the diagram of FIG. 2.

Next, with reference to FIG. 3, which is a continuation of the diagram of FIG. 2, steps 216-218 of method 200 will be described, which comprise a user identity verification phase of the method. At 216 the method may include receiving an identity verification request inquiring about an unverified user logging into a service from a different client device than is on record with the service. The request may ask whether the different client device is linked to the user in the virtual identity record. The request may also include a specified level of certainty that the different client device is linked to the user in the virtual identity record. If the specified level of certainty is satisfied, at 218 the method may include sending a response to the service indicating that the different client device is linked to the user.

Next, steps 220-222 of method 200 will be described, which comprise a user ad targeting phase of the method. At 220, the method includes sending information from the virtual identity record to an ad engine, where the ad engine is configured to serve a user-targeted ad to one of the two or more client devices. At 222, the method may include serving a user-targeted ad to one of the two or more client devices.

Next, steps 224-227 of method 200 will be described, which comprise a friend ad targeting phase of the method. As discussed above, one of the request and response streams may include social network information associated with interactions of the user across a social network that establishes a social graph. At 224, the method may include determining that the user has a relationship with a friend based on the social network information and that the user and the friend have a shared interest, and storing this information in the virtual identity record.

Further, as described above, another of the request and response streams may include commercial transaction information associated with the user. At 225, the method may include detecting from the commercial transaction information a commercial transaction by the user that is related to the shared interest with the friend (determined at 224), the commercial transaction being entered into by the user via one of the plurality of user client devices linked to the user's virtual identity record. At 226, the method may include sending information regarding the commercial transaction that is related to the shared interest between the friend and the user to the ad engine, to enable the ad engine to serve a friend-targeted ad to a client device associated with the friend based on the commercial transaction information. At 227, the method may include serving a friend-targeted ad to a client device associated with the friend based on the commercial transaction information of the user. Typically, the ad is served from the ad engine to the client device of the friend.

It will be appreciated that steps 224-227 enable the method 200 to serve ads to friends of the user based on streams of information monitored from different user client devices. Thus, if a user browses a social networking site from a first client device from which a friend and a shared interest are determined, and purchases a product or service related to the shared interest with the friend from a second user client device, these activities will be represented in the social networking information gleaned from the first device and commercial transaction information gleaned from the second device. Both of these types of information are linked to the virtual identity record for the user, and available for the ad engine to serve ads to friends of the user. Typically the ad engine will request the virtual identity management server for users and friends matching profiles that advertisers have specified in ad campaigns managed by the ad engine. Thus, in the above example, the ad engine would have requested the identities of friends of users that recently purchased Super Fast racing bicycles, and who have a shared interest in bicycling with the user. When those friends browse the Internet or execute application programs in a manner that causes ad requests to be sent to the ad engine, the ad engine will respond by serving the friend-targeted ad described above.

Next, steps 228-230 of method 200 will be described, which comprise a fraud detection phase of the method. At 228, the method may include detecting an identifying factor for one of the plurality of client devices used by the user that is inconsistent with the virtual identity record. Once the inconsistent identifying factor is detected, at 230 the method may include sending a potential fraud alert to another of the plurality of client devices used by the user.

It will be appreciated that the above described systems and methods may be utilized to manage an identity of a user across multiple user client devices. Further, the system and method may enable a user to easily and securely share identity information across multiple services, networks and platforms as selected by the user. The online experience of the user across these various online destinations may therefore be a less fragmented and more enjoyable experience. Facilitating the secure sharing of identity information may also enable the user to receive advertising and recommendations that are more relevant and desirable.

Regarding the software and hardware operating environments described herein, it will be appreciated that the terms "module," "program," and "engine" have been used to describe software components that are implemented by processors of the various computing hardware devices described herein, to perform one or more particular functions. The terms "module," "program," and "engine" are meant to encompass individual or groups of executable files, data files, libraries, drivers, scripts, database records, etc. Further, it will be understood that the virtual ID management server 12 and other servers described herein, while illustrated as a single server for ease of discussion purposes, may be implemented as a group of coordinated servers, which may be co-located or distributed across a computer network, as will be appreciated by those familiar with cloud computing environments.

It will also be understood that the term "client device" may include personal computers, laptop devices, mobile communication devices, tablet computers, home entertainment computers, gaming devices, smart phones, or various other computing devices. Further, the processor and memory may be integrated in a common integrated circuitry, as a so-called system on a chip in some embodiments, and the mass storage may be a variety of non-volatile storage devices, such as a hard drive, firmware, read only memory (ROM), electronically erasable programmable read only memory (EEPROM), FLASH memory, optical drive, etc. Media may be provided for these computing devices, which contains stored instructions that when executed by these computing devices causes the devices to implement the methods described herein. These media may include CD-ROMS, DVD-ROMS, and other media.

It is to be understood that the example embodiments, configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system for managing an identity of a user, comprising:
a server comprising a processor and configured to communicate with each of a plurality of client devices in corresponding request and response streams;
an inference engine executed by the processor of the server and configured to:
monitor the request and response streams between the server and each of the plurality of client devices for identifying factors that distinguish each of the plurality of client devices from other of the plurality of client devices;
make an inference that two or more of the plurality of client devices are used by the user, upon detecting one or more of the identifying factors for each of the two or more client devices that match within a threshold probability; and
based upon the inference, create a virtual identity record at the server linking the two or more client devices; and
an identity verification engine executed by the processor of the server and configured to:
receive an identity verification request inquiring about an unverified user logging into a service from a different client device than is on record with the service, the request asking whether the different client device is linked to the user in the virtual identity record.

2. The computing system of claim 1, wherein the inference engine is configured to estimate a degree of accuracy associated with the inference.

3. The computing system of claim 2, wherein the degree of accuracy is based on machine learnings from linking other users and their corresponding client devices.

4. The computing system of claim 1, wherein the inference engine is configured to send information from the virtual identity record to an ad engine, and the ad engine is configured to send a user-targeted ad to one of the two or more client devices.

5. The computing system of claim 4, wherein one of the request and response streams includes social network information associated with interactions of the user across a social network that establishes a social graph.

6. The computing system of claim 5, wherein the inference engine is configured to:
receive social graph information related to the user from a plurality of social networks each executed on a different social network server;
create a social supergraph for the user from the plurality of social graphs from different social networks; and
compute a cross social network communication path between users who are not otherwise connected to each other through each of the different social networks.

7. The computing system of claim 6, wherein another of the request and response streams includes commercial transaction information associated with the user, the commercial transaction information indicating the user has purchased a product or service, the product or service being related to a shared interest between the user and a friend of the user identified in the social network information; and
wherein the ad engine is configured to serve a friend-targeted ad to a client device associated with the friend based on the commercial transaction information.

8. The computing system of claim 1, wherein the identifying factors are selected from the group consisting of a device ID, a browser version, browser history, a browser cookie, a search profile, commercial transaction information, location information, and social graph information.

9. The computing system of claim 1, wherein the request received by the identity verification engine includes a specified level of certainty that the different client device is linked to the user in the virtual identity record, and the identity verification engine is configured to send a response to the service indicating the different client device is linked to the user if the specified level of certainty is satisfied.

10. The computing system of claim 1, wherein the identity verification engine is configured to:
detect an identifying factor for one of the plurality of client devices used by the user that is inconsistent with the virtual identity record; and
send a potential fraud alert to another of the plurality of client devices used by the user.

11. A server-based method for managing an identity of a user, comprising:
communicating by the server with each of a plurality of client devices in corresponding request and response streams;
monitoring by the server the request and response streams for identifying factors that distinguish each of the plurality of client devices from other of the plurality of client devices;
detecting by the server one or more of the identifying factors that match within a threshold probability for each of two or more of the plurality of client devices;
making by the server an inference that the two or more client devices are used by the user,
based upon the inference, creating by the server a virtual identity record linking the two or more client devices; and
sending by the server information from the virtual identity record to an ad engine, wherein the ad engine is configured to serve a user-targeted ad to one of the two or more client devices.

12. The method of claim 11, further comprising estimating a degree of accuracy associated with the inference based on machine learnings from linking other users and their corresponding client devices.

13. The method of claim 12, further comprising sending a request to the user to verify the inference.

14. The method of claim 11, further comprising receiving an identity verification request inquiring about an unverified user logging into a service from a different client device than is on record with the service, the request asking whether the different client device is linked to the user in the virtual identity record.

15. The method of claim 11, wherein one of the request and response streams includes social network information associated with interactions of the user across a social network that establishes a social graph.

16. The method of claim 15, wherein another of the request and response streams includes commercial transaction information associated with the user, the method further comprising:
   determining that the user has a relationship with a friend based on the social network information and that the user and the friend have a shared interest related to the commercial transaction, and
   wherein sending information from the virtual identity record to the ad engine includes sending information regarding the commercial transaction related to the shared interest between the friend and the user to the ad engine, to enable the ad engine to serve a friend-targeted ad to a client device associated with the friend based on the commercial transaction information.

17. The method of claim 11, wherein the identifying factors are selected from the group consisting of a device ID, a browser version, browser history, a browser cookie, a search profile, commercial transaction information, location information, and social graph information.

18. The method of claim 11, wherein the request received by the identity verification engine includes a specified level of certainty that the different client device is linked to the user in the virtual identity record, further comprising sending a response indicating the different client device is linked to the user if the specified level of certainty is satisfied.

19. The method of claim 11, further comprising:
   detecting an identifying factor for one of the plurality of client devices used by the user that is inconsistent with the virtual identity record; and
   sending a potential fraud alert to another of the plurality of client devices used by the user.

* * * * *